(12) United States Patent
Xue et al.

(10) Patent No.: US 12,469,262 B2
(45) Date of Patent: Nov. 11, 2025

(54) SUBJECTIVE QUALITY ASSESSMENT TOOL FOR IMAGE/VIDEO ARTIFACTS

(71) Applicants: Disney Enterprises, Inc., Burbank, CA (US); Beijing YoJaJa Software Technology Development Co., Ltd., Beijing (CN)

(72) Inventors: Yuanyi Xue, Alameda, CA (US); Scott Labrozzi, Cary, NC (US); Wenhao Zhang, Beijing (CN); Christopher Richard Schroers, Uster (CH); Roberto Gerson De Albuquerque Azevedo, Zurich (CH); Xuchang Huangfu, Beijing (CN); Lemei Huang, Beijing (CN); Yang Zhang, Dübendorf (CH)

(73) Assignees: Disney Enterprises, Inc., Burbank, CA (US); Beijing YoJaJa Software Technology Development Co., Ltd., Beijing (CN)

( * ) Notice: Subject to any disclaimer, the term of this patent is extended or adjusted under 35 U.S.C. 154(b) by 0 days.

(21) Appl. No.: 18/633,170

(22) Filed: Apr. 11, 2024

(65) Prior Publication Data

US 2024/0362896 A1 Oct. 31, 2024

Related U.S. Application Data

(60) Provisional application No. 63/498,642, filed on Apr. 27, 2023.

(51) Int. Cl.
*G06V 10/774* (2022.01)
*G06T 7/00* (2017.01)
*G06V 10/26* (2022.01)

(52) U.S. Cl.
CPC .......... *G06V 10/774* (2022.01); *G06T 7/0002* (2013.01); *G06V 10/26* (2022.01);
(Continued)

(58) Field of Classification Search
CPC ............. H04N 21/252; H04N 21/4667; H04N 21/4756; H04N 21/23418;
(Continued)

(56) References Cited

U.S. PATENT DOCUMENTS 8,532,198 B2 9/2013 Kumwilaisak et al.
10,949,604 B1 3/2021 Dwivedi et al.
(Continued)

FOREIGN PATENT DOCUMENTS

CN 105551062 A 5/2016
CN 109376731 A 2/2019
(Continued)

OTHER PUBLICATIONS

Ying et al. ("Patch-VQ: 'Patching Up' the Video Quality Problem"; Jun. 20, 2021; IEEE/CVF Conference on Computer Vision and Pattern Recognition (CVPR), IEEE; pp. 14014-14024, XP034008989, DOI: 10.1109/CVPR46437.2021.01380; pp. 11; [Provided in IDS]) (Year: 2021).*

(Continued)

*Primary Examiner* — Peet Dhillon
(74) *Attorney, Agent, or Firm* — Kwan & Olynick LLP

(57) ABSTRACT

In some embodiments, a method sends information for a sample of content, a first question, and a second question for output on an interface. The first question receives, from a subject, a first response for a sample level rating for an artifact that is perceived to be visible in the sample and the second question receives, from the subject, a second response for regions in the sample that are perceived to contain the artifact. The method receives the first response (Continued)

for the sample level rating and the second response for regions that are perceived to contain the artifact. First responses are combined from multiple subjects to generate an opinion score for the sample and second responses are combined to generate region scores for regions. The method generates training data from the opinion score and the region scores to train a process to perform an action based on the artifacts.

20 Claims, 14 Drawing Sheets
(2 of 14 Drawing Sheet(s) Filed in Color)

(52) U.S. Cl.
CPC ............... *G06T 2207/10016* (2013.01); *G06T 2207/20081* (2013.01); *G06T 2207/30168* (2013.01)

(58) Field of Classification Search
CPC .... H04N 21/44008; G06T 2207/10016; G06T 2207/20081; G06T 2207/30168; G06T 7/0002; G06V 10/26; G06V 10/774
See application file for complete search history.

(56) References Cited

U.S. PATENT DOCUMENTS

| | | | |
|---|---|---|---|
| 2007/0103551 A1 | 5/2007 | Kim et al. | |
| 2010/0135575 A1* | 6/2010 | Guo | G06T 7/90 382/164 |
| 2010/0309985 A1* | 12/2010 | Liu | H04N 19/86 375/E7.027 |
| 2013/0093768 A1 | 4/2013 | Lockerman et al. | |
| 2017/0078706 A1* | 3/2017 | Van Der Vleuten | G06T 5/92 |
| 2018/0034852 A1 | 2/2018 | Goldenberg | |
| 2018/0167620 A1 | 6/2018 | Li et al. | |
| 2019/0156459 A1 | 5/2019 | Chen | |
| 2019/0261016 A1 | 8/2019 | Liu et al. | |
| 2019/0340468 A1* | 11/2019 | Stumpe | G16H 30/40 |
| 2020/0352518 A1* | 11/2020 | Lyman | A61B 6/5258 |
| 2022/0414402 A1* | 12/2022 | Sawkey | G06N 3/045 |
| 2023/0098732 A1* | 3/2023 | Alemi | G06T 5/73 382/128 |
| 2023/0131228 A1* | 4/2023 | Wang | G06T 5/70 382/275 |
| 2023/0187072 A1* | 6/2023 | Neumann | G16H 50/20 705/2 |
| 2023/0274818 A1* | 8/2023 | Etemadi | G16H 15/00 382/128 |
| 2023/0282012 A1 | 9/2023 | Borges | |
| 2024/0296535 A1* | 9/2024 | Bakunov | G06T 7/0002 |

FOREIGN PATENT DOCUMENTS

| | | |
|---|---|---|
| CN | 114170198 A | 3/2022 |
| CN | 117935180 A | 4/2024 |
| EP | 4456539 A3 | 10/2024 |
| JP | 4527127 B | 8/2010 |
| WO | 2019125026 A1 | 6/2019 |
| WO | 2023235730 A1 | 12/2023 |

OTHER PUBLICATIONS

"SSIMWAVE", IMAX Streaming and Consumer Technology (IMAX SCT), Retrieval date: Apr. 10, 2024. Retrieved from internet: https://www.imax.com/sct/product/streamsmart-on-demand.
"FFmpeg", FFmpeg Developers, Retrieval date: Apr. 10, 2024. Retrieved from internet: https://ffmpeg.org/.
Campbell, Fergus W., and John G. Robson. "Application of Fourier analysis to the visibility of gratings." The Journal of physiology 197, No. 3 (1968): 551.
ITU-T, Recommandation. "BT.500-14 Methodology For the Subjective Assessment of the Quality of Television Pictures." International Telecommunication Union, Geneva. 2019.
ITU-T, Recommandation. "P910 Subjective video quality assessment methods for multimedia applications." International Telecommunication Union, Geneva. 2022.
ITU-T, Recommendation. "P911 Subjective Audiovisual Quality Assessment Methods for Multimedia Applications." International Telecommunication Union, Geneva. 1998.
Kapoor, Akshay, Jatin Sapra, and Zhou Wang. "Capturing banding in images: Database construction and objective assessment." In ICASSP 2021-2021 IEEE International Conference on Acoustics, Speech andSignal Processing (ICASSP), pp. 2425-2429. IEEE, 2021.
Mittal, Anish, Anush Krishna Moorthy, and Alan Conrad Bovik. "Noreference image quality assessment in the spatial domain." IEEE Transactions on image processing 21, No. 12 (2012): 4695-4708.
Tandon, Pulkit, Mariana Afonso, Joel Sole, and Lukáš Krasula, "CAMBI: Contrast-aware multiscale banding index." In 2021 Picture Coding Symposium (PCS), pp. 1-5. IEEE, 2021.
Tu, Zhengzhong, Jessie Lin, Yilin Wang, Balu Adsumilli, and Alan C. Bovik. "Adaptive debanding filter." IEEE Signal Processing Letters 27 (2020): 1715-1719.
Extended European Search Report for EP App No. 24170914.6, dated Sep. 30, 2024, 16 pgs.
Tandon Pulkit et al: "CAMBI: Contrast-aware Multiscale Banding Index", 2021 Picture Coding Symposium (PCS), IEEE, Jun. 29, 2021 (Jun. 29, 2021), pp. 1-5, XP033945096,DOI: 10.1109/PCS50896.2021.9477464 [retrieved on Jul. 7, 2021], 5 pgs.
Testolina Michela et al: "Review of subjective quality assessment methodologies and standards for compressed images evaluation", Proceedings of the SPIE, SPIE, US, val. 11842, Aug. 1, 2021 (Aug. 1, 2021), pp. 118420Y-118420Y, XP060146862, ISSN: 0277-786X, DOI: 10.1117/12.2597813 ISBN: 978-1-5106-5738-0, 14 pgs.
Tu Zhengzhong et al: "Bband Index: a No-Reference Banding Artifact Predictor", ICASSP 2020-2020 IEEE International Conference on Acoustics, Speech and Signal Processing (ICASSP), IEEE, A,P May 4, 2020 (May 4, 2020), pp. 2712-2716, XP033793303, DOI: 10.1109/ICASSP40776.2020.9053634 [retrieved on Apr. 1, 2020], 5 pgs.
Xiang Jie et al: "A Deep Learning-Based No-Reference Quality Metric for High-Definition Images Compressed With HEVC" I IEEE Transactions on Broadcasting, IEEE Service Center, Piscataway, NJ, US, val. 69, No. 3, Sep. 1, 2023 (Sep. 1, 2023), pp. 779-789, XP011948768, ISSN: 0018-9316, DOI: 10.1109/TBC.2023.3277193 [retrieved on Jun. 2, 2023], 11 pgs.
Xue Yuanyi et al: "Large-Scale Multi-Site 1-15 Subjective Assessment on Image Banding Artifacts", 2023 15th International Conference on Quality of Multimedia Experience {QOMEX), IEEE, Jun. 20, 2023 (Jun. 20, 2023), pp. 213-216, XP034379507, DOI: 10.1109/QOMEX58391.2023.10178613 [retrieved on Jul. 18, 2023], 4 pgs.
Ying Zhenqiang et al: "Patch-VQ: 'Patching Up' the Video Quality Problem", 2021 IEEE/CVF Conference on Computer Vision and Pattern Recognition (CVPR), IEEE,Jun. 20, 2021 (Jun. 20, 2021), pp. 14014-14024, XP034008989, DOI: 10.1109/CVPR46437.2021.01380 [retrieved on Oct. 15, 2021], 11 pgs.
U.S. Appl. No. 18/653,592, filed Apr. 11, 2024, Inventor Xuchang Huangfu et al, Titled: "Banding Artifact Assessment Method", Accessible via Patent Center.
Madhusudana, Pavan C. et al, "Image Quality Assessment Using Contrastive Learning." IEEE Transactions on Image Processing, Oct. 25, 2021, 10 pages.
Mingyang Song et al., "A Generative Model for Digital Camera Noise Synthesis", ETH Zurich, Switzerland; Disney Research Studios, Mar. 17, 2023, 18 pages.
Chen Zijian et al: "BAND-2k: Banding 1-15 INV. Artifact Noticeable Database for Banding G06T7/40 Detection and Quality Assessment", IEEE Transactions on Circuits and Systems for Video Technology, IEEE, USA, vol. 34, No. 7, Feb. 15, 2024 (Feb. 15, 2024), pp. 6347-6362, XP011974344.

(56) References Cited

OTHER PUBLICATIONS

Extended European Search Report, EP Application No. 25157981.9, mailed Jul. 1, 2025, 10 pages.

* cited by examiner

1. Rate the artifact quality of the image 1 star – Very annoying
2 stars – Annoying
3 stars – Slightly Annoying
4 stars Perceptible, but not annoying
5 stars - Imperceptible 2. Select all the regions in the image that you see artifacts

| 1 | 2 | 3 | 4 |
|---|---|---|---|
| 5 | 6 | 7 | 8 |
| 9 | 10 | 11 | 12 |

FIG. 3

SUBJECTIVE QUALITY ASSESSMENT TOOL FOR IMAGE/VIDEO ARTIFACTS

CROSS REFERENCE TO RELATED APPLICATIONS

Pursuant to 35 U.S.C. § 119(e), this application is entitled to and claims the benefit of the filing date of U.S. Provisional App. No. 63/498,642 filed Apr. 27, 2024, entitled "Subjective Quality Assessment Tool for Image/Video Artifacts", the content of which is incorporated herein by reference in its entirety for all purposes.

BACKGROUND

Artifacts in digital video may be distortions that appear in the video. Different types of artifacts may occur. For example, one artifact is banding, which may be where a continuous change of luminance and chrominance becomes a sudden drop in values creating visible bands that should not be present in the video. The banding artifact may occur when the available bit depth for presenting the luminance or chrominance information is limited. That is, having 8 bits to represent the luminance and chrominance information may result in more visible bands compared to having more bit depth, such as 10 or 12 bits, to represent the luminance and chrominance information. Other artifacts may also result in video for different reasons.

A video delivery system may want to mitigate the occurrence of the artifacts that may occur in a video. However, it may be challenging to identify and measure the artifacts, and then later mitigate the artifacts.

BRIEF DESCRIPTION OF THE DRAWINGS

The included drawings are for illustrative purposes and serve only to provide examples of possible structures and operations for the disclosed inventive systems, apparatus, methods and computer program products. These drawings in no way limit any changes in form and detail that may be made by one skilled in the art without departing from the spirit and scope of the disclosed implementations. The patent or application file contains at least one drawing executed in color. Copies of this patent or patent application publication with color drawing(s) will be provided by the Office upon request and payment of the necessary fee.

FIG. 3 depicts an example of a window that lists the two questions according to some embodiments.

DETAILED DESCRIPTION

Figure 1:
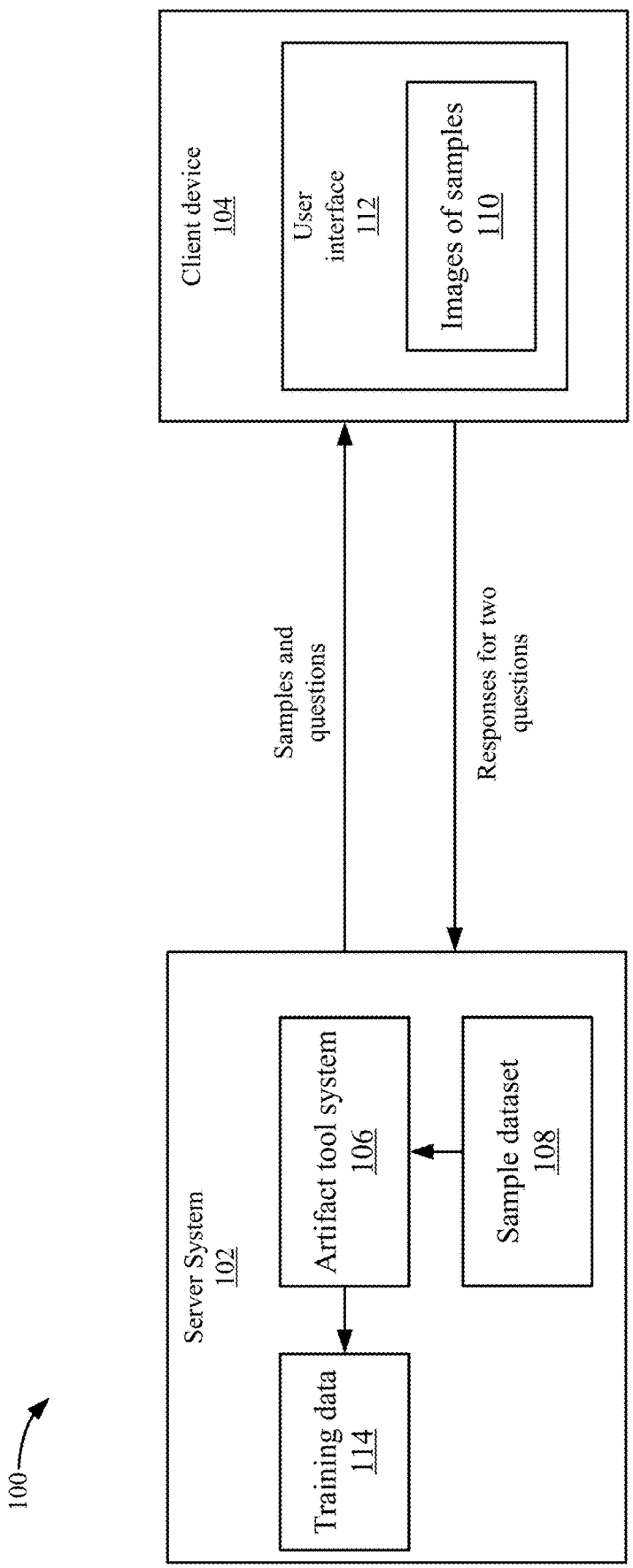
FIG. 1 depicts a simplified system for generating training data according to some embodiments.

Described herein are techniques for a content processing system. In the following description, for purposes of explanation, numerous examples and specific details are set forth to provide a thorough understanding of some embodiments. Some embodiments as defined by the claims may include some or all the features in these examples alone or in combination with other features described below, and may further include modifications and equivalents of the features and concepts described herein.

System Overview

A system uses a process to improve the evaluation of artifacts in content, such as video, images, and other content. The process may generate an improved set of training data based on artifacts that are evaluated in content. Then, the training data may also be used to improve the training of processes used to perform actions for artifacts, such as actions to identify, measure, or mitigate the artifacts. The system may use a subjective process that may receive subjective data from client devices. In some embodiments, the system may output samples of content, such as an image (e.g., from a video), images, a video clip, or other content, on a user interface. The disclosure may use "image" as an example, but the sample that is output may be other types of content. Then, the system may output a first question that requests an image level rating for the image based on the artifacts that are perceived in the image. The image level rating may be a rating for the image as a whole without specifying regions. For example, the question may ask for a rating of the visibility of artifacts in the image from a scale of 1-5, with lower values meaning more artifacts are visible compared to higher values that mean less or no artifacts are visible. The system also outputs a second question that is designed to collect perceptual data on the artifact visibility on the sub-image level. For example, the question requests that subjects select one or more predefined regions within the image in which artifacts may be visible.

When multiple subjects have provided responses for the image, the system may analyze the responses to create an improved set of training data. The responses may be processed to generate an image level score, such as a mean opinion score (MOS), that rates the artifact visibility in the image. For example, the mean opinion score may be based on the average score received from the subjects from the first question. If a scale is from 1-5, a low score may mean that more artifacts are visible in the image and a high score may mean that less artifacts are visible in the image.

There may be some correlation between the score for the first question and the responses for the second question. In some examples, a low score for the first question may intuitively suggest that more regions (e.g., most regions) within the image may be selected for the second question. However, a high score may indicate that fewer regions (e.g., none or not very many) within the image may be selected as including visible artifacts. However, when the image level score is towards the middle of the range, such as around 2-3, then it may be harder to discern where the artifacts are visible in the image. For example, when two images have an image level score around 2.5, the visible artifacts in the two images may concentrate in different regions. The regions that are selected within the frame will help determine where the artifacts are visible and provide more granular (i.e., sub-image level) information for these two images. Even when the image level scores are low or high, the regions that are selected may also help as not all regions may be selected by subjects even when an image level score is 1 or some regions may be selected when an image level score is 5.

Accordingly, by receiving responses for the second question, the training data may be improved. For example, the regions in which visible artifacts were selected may be used to differentiate similar image-level opinion scores for the two different images. For example, if only a score of around 2.5 is associated with the two images from the first question, the training data gathered at the image level would not be able to distinguish between the visible artifacts occurring in different regions in the two images. However, using the improved training data with the regions that are selected, the training data can train a process with information where the visible artifacts were perceived to be more prevalent in the two different images even though the two images had the similar image level score. The region scores and opinion scores may be a subjective ground truth in training. The region scores may predict where artifacts are located in the image. This may allow the parameters of the process to be more finely tuned, which will improve the output of the process to measure or mitigate the artifacts. Also, the process may be able to differentiate between the images with similar scores and adjust the parameters to converge faster. The artifacts may be hard to describe where in images they appear and when. The region scores and opinion scores improve the training process by providing this information. Further, as will be discussed in more detail below, cropped patches of different portions of the image may be analyzed. If the same image level score is used for all the cropped patches of an image, but some cropped patches have artifacts that are more prevalent, the training of the process may not be optimal. However, using the region scores from sub-image regions that are crossed by the cropped patch to generate cropped patch scores may improve the training data and also the training process of the parameters for measuring or mitigating the artifacts.

System

FIG. 1 depicts a simplified system 100 for generating training data 114 according to some embodiments. System 100 includes a server system 102 and a client device 104. Although single instances of server system 102 and client device 104 are described, server system 102 may be interacting with multiple client devices 104. Server system 102 may be implemented using one or more computing devices that interact with client devices 104. Client device 104 may be implemented using a user device that is being used by subjects (e.g., users).

Server system 102 includes an artifact tool system 106 that may generate training data 114. Artifact tool system 106 may receive samples from sample dataset 108. The samples may be content, such as images. The images may be frames from one or more videos. The samples may be selected to show different conditions for artifacts being measured. The artifacts may be distortions that appear in the video that should not be present in the video. The image may include multiple instances of an artifact (e.g., banding artifacts) that may be included in different regions of the image. Sample dataset 108 may include a diverse set of genres and content characteristics that may provide visible artifacts (e.g., banding artifacts) and minimize the appearance of other artifacts (e.g., blurring artifacts). The samples may also focus on both artifacts from a pre-processing stage (e.g., prior to the input of the image to an encoder), as well as after the encoding process. Further, sample dataset 108 may be balanced with a wide range of instances of artifacts, including a small set of unique and challenging frames in which mitigation may be hard. The following may discuss banding artifacts as being used, but other artifacts may be appreciated, such as blocking artifacts, blurring artifacts, noise, network artifacts (e.g., from lost packets, which adversely affect decoding the video stream), compression artifacts, generative model artifacts (e.g., hallucinations, missing objects, etc.), or any other artifacts.

Artifact tool system 106 may send information for samples of the images to client device 104. Client device 104 includes user interface 112, that may use the information to display samples at 110. For example, user interface 112 may be configured to display images on screen for a subject to view. The order of display of the samples may be different, such as a random order may be used when viewed by multiple subjects, a set order may be used for multiple subjects, orders may be changed for multiple subjects, etc. A subject may be a user that is providing a subjective opinion on the image.

Artifact tool system 106 also sends information for questions to client device 104. In some embodiments, user interface 112 uses the information to display the questions in an input window with the image. In some embodiments, the first question may ask for input regarding an image level perceptual quality on artifact visibility in the image. In some embodiments, a discrete scale rating may be used, such as a scale of 1-5. The score may be based on the strength of the impairment of artifact visibility on the image as perceived by the subject. For example, a lower score may mean more artifacts are visible compared to a higher score which indicates that less artifacts are visible. The second question may output predefined regions within the image. The subject may be able to select predefined regions in the image in which artifacts are perceived.

Client device 104 may receive input from subjects and send the responses for one or more questions, such as two questions, to server system 102. For example, interface 112 receives input from subjects for an image level rating from 1 to 5. Then, interface 112 receives input that specifies regions in the image that are perceived to contain artifacts. When two questions are described, the questions may be formulated in different formats and are not limited to two questions. For example, a single question may have two parts. Also, the two questions may be separated out into two or more questions. There may be other introductory text, or other information. Other questions may also be appreciated.

Artifact tool system 106 stores the value received for the first question and identifiers for the regions that were selected in the second question. After responses are received from multiple subjects, artifact tool system 106 may process the responses to generate training data 114. Training data 114 may then be used to train a process that may identify, measure, mitigate, or perform other actions for the artifacts.

For training data 114, artifact tool system 106 may combine responses from the first question and the second question. In some embodiments, artifact tool system 106 generates an overall image level score using the responses to the first question from multiple subjects. In some embodiments, artifact tool system 106 generates a mean opinion score (MOS), which may be a subjective assessment score that is based on an average of the image level scores from multiple subjects. An example of an image level score for five scores may be (4+5+4+3+4)/5=4. Also, artifact tool system 106 may generate region scores for the regions for the second question. In some embodiments, artifact tool system 106 generates a representation for the region scores, such as a heat map, where the representation may include region scores based on the responses that are received for each region in the image from multiple subjects. For example, a region may have a higher region score when more subjects have selected a region and a lower region score when fewer subjects have selected a region. In some examples, if there are 100 subjects and 90 subjects select the region, the heat map may list a region score of 90.0 Also, if a region was selected 10 times, then the heat map may list a region score of 10.0 for the region.

Training data 114 may then be used to train a process. In some embodiments, the process may include a prediction network, such as a neural network, and training data 114 may be used to adjust parameters of the prediction network. For example, if the prediction network is measuring a visibility of artifacts in the image, the image or portions of the image may be input into the prediction network and the prediction network outputs an image level score and regions scores. Training data for the image may then be compared to the output and the difference is used to adjust the parameters of the prediction network such that the output is closer to the training data. Other methods of using training data 114 may also be appreciated and will be described in more detail below.

The following will now describe the assessment method and then the analysis of the responses to generate training data 114.

Assessment Method

Figure 2:
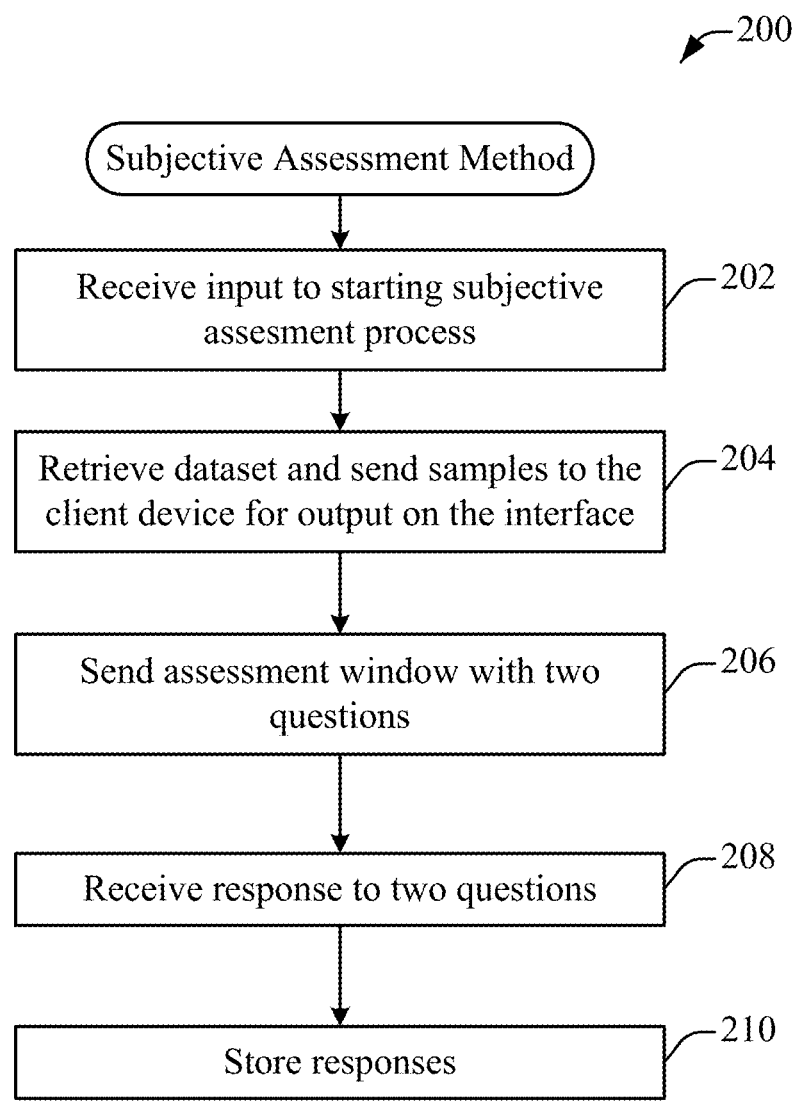
FIG. 2 depicts a simplified flowchart for performing a subjective assessment of images according to some embodiments.

FIG. 2 depicts a simplified flowchart 200 for performing a subjective assessment of images according to some embodiments. At 202, artifact tool system 106 receives input to start the subjective assessment process. For example, a subject (e.g., a user that will provide input) may start the process.

At 204, subjective assessment tool 106 retrieves a dataset for the subjective assessment process that was started and sends samples to client device 104 for output on user interface 112. For example, the dataset may be a series of images. In some embodiments, the dataset may be images from one video, multiple videos, stand-alone images (e.g., pictures), a video clip, or other content.

At 206, artifact tool system 106 sends information for an assessment window with two questions. User interface 112 may output the window and the images of the dataset. The window may be any item on user interface 112 that provides guidance for the two questions and allows the response to the questions to be input by a subject. The window will be described in more detail in FIG. 3. User interface 112 may display the image in conjunction with the window.

User interface 112 may receive the response to the two questions and send the response to server system 102. For example, a subject may input a number from 1-5 for the first question and select which regions artifacts may be visible for the second question. Then, at 208, artifact tool system 106 receives the response to the two questions. For example, the value of "3" and the identifiers for the regions that were selected may be received. At 210, artifact tool system 106 stores the responses.

The above process may be performed for multiple images in the dataset and the responses may be stored. Also, the above process may be performed with multiple subjects, who each can provide responses to the two questions for the images in the dataset. As will be described in more detail in FIG. 5, artifact tool system 106 may then analyze the responses to produce training data 114.

As discussed above at 206, an assessment window may be used. FIG. 3 depicts an example of a window 300 that lists the two questions according to some embodiments. At 302, the first question is displayed and allows a subject to provide input for the image level question. In some embodiments, a range of 1-5 is provided. A description of each of the ratings could be provided, such as the description for each rating may describe the perceptual visibility of artifacts for respective ratings. In some embodiments, a rating of "1 star" may mean that the subject perceives the artifacts as very annoying, a rating of "2 stars" indicates that the subject may perceive the artifacts as annoying, a rating of "3 stars" indicates that the subject may perceive the artifacts as slightly annoying, a rating of "4 stars" indicates that the subject may perceive the artifacts as perceptible, but not annoying, and a rating of "5 stars" indicates that the subject may perceive the artifacts as imperceptible. Although these ratings and descriptions are used as an example herein, other variations of descriptions may be provided to guide the subject in selecting one of the ratings, and also other ranges or rating systems may be used.

At 304, the second question is displayed. Although two questions are shown, one or more questions may be used. A map 306 of predefined regions in the image may be provided. In this example, 12 predefined regions in the image are shown. Input from the subject may be received to select any number of the regions in which the subject perceives artifacts to be visible. Also, an input may be provided to indicate the subject does not perceive any artifacts to be visible in any of the regions. In some examples, input from the subject may be received for regions 1, 2, 5, and 6 if the subject perceives that these regions include artifacts. This may mean that regions 3, 4, 7, 8, 9, 10, 11, and 12 do not include artifacts that can be visually perceived by the subject. The input for the regions may be received in different ways. For example, a selection on the image may be received in a region, the region in map 306 may be selected, a number for the region may be received, etc.

Figure 4:
FIG. 4 depicts an example of an image in which regions have been selected according to some embodiments.

FIG. 4 depicts an example of an image 400 in which regions have been selected according to some embodiments. Regions 402-1, 402-2, 402-3, and 402-4 are shown with red boxes indicating the regions have been selected as including artifacts in the image. In this case, input from the subject may have selected regions 3, 4, 5, and 8 in map 306 or regions 402-1, 402-2, 402-3, and 402-4 may have been selected in image 400. In some embodiments, user interface 112 may show the boxes or the regions that are selected, such as outlined in user interface 112. This shows the subject which regions have been selected as including artifacts. This may improve the interface in that it allows the subject to see exactly which regions have been selected, and then the subject can select other regions, or deselect regions that have been selected.

After receiving the responses from the subject, artifact tool system 106 may analyze the responses to create training data 114. Then, artifact tool system 106 may also perform a training process using training data 114.

Analysis and Training Process

Figure 5:
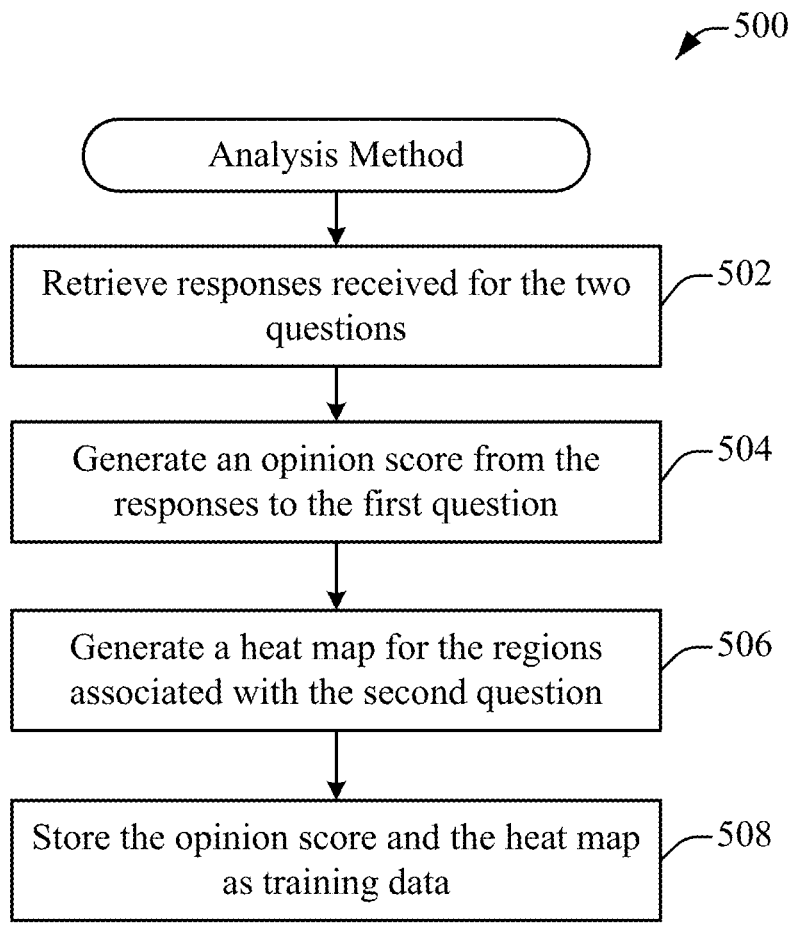
FIG. 5 depicts a simplified flowchart of a method to analyze responses according to some embodiment.

FIG. 5 depicts a simplified flowchart 500 of a method to analyze responses according to some embodiment. At 502, artifact tool system 106 retrieves responses that were received for the two questions from multiple subjects using client devices 104. The following analysis process may be performed for a single image or the analysis process may be performed for multiple images for multiple subjects to form training data 114. In some embodiments, multiple images from one or more videos may be analyzed.

At 504, artifact tool system 106 generates an opinion score from the responses to the first question. The opinion score may be based on multiple image level scores from multiple subjects. Different methods may be used to generate the opinion score. In some embodiments, some post-processing of the image level opinion scores from subjects may be performed. For example, artifact tool system 106 may remove some outliers from the image level opinion scores from some subjects. Outliers may be determined using different methods and may generally be some responses that are outside of a threshold from other responses. In some embodiments, a mean opinion score (MOS) may be used, which is an average of the image level opinion scores that have not been removed as outliers.

At 506, artifact tool system 106 generates a heat map for regions associated with the second question. Although a heat map is described, other representations may be generated. An example of the heat map is shown in further detail in FIG. 6. The heat map may determine region scores for regions based on the responses from subjects. For example, the region score may be based on the percentage of subjects that selected the region. In some examples, if 80% of the subjects selected a region, then the heat map region score may be 80.0. If only 20% of the subjects selected another region, the heat map region score may be 20.0. Other methods to determine the values for the heat map may also be used, such as taking the cumulative number of selections from subjects as the region score. In some embodiments, outlier detection may be used to remove outliers of region selection from subjects. In this example, the higher a region score means artifacts are more visible. A person of skill in the art would appreciate other rating systems.

At 508, artifact tool system 106 stores the opinion scores and the heat map as training data 114. Training data 114 may be associated with the image, such as indexed by an identifier for the image.

Figure 6:
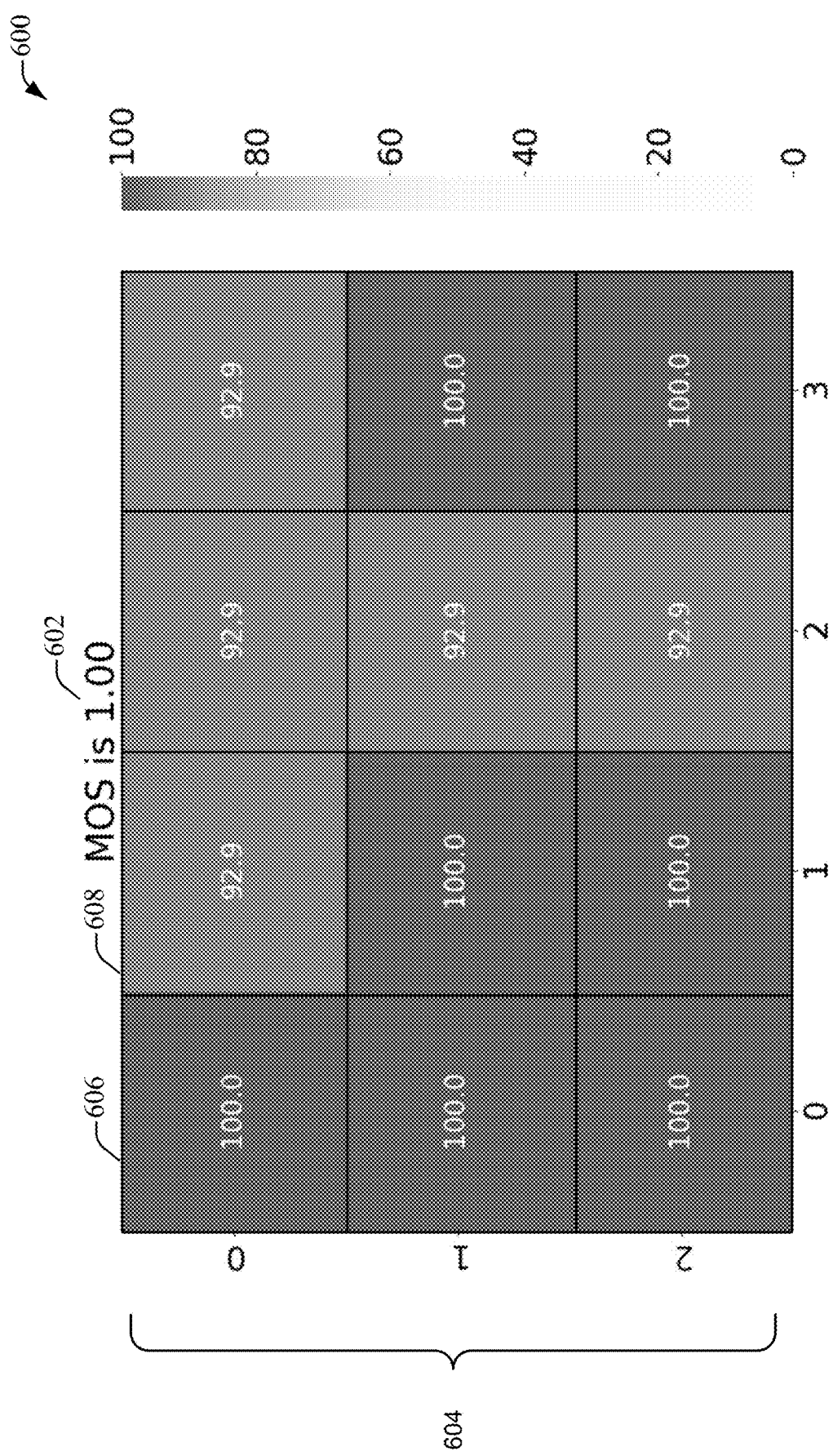
FIG. 6 depicts an example of an opinion score and heat map according to some embodiments.

FIG. 6 depicts an example of an opinion score and heat map according to some embodiments. At 602, the opinion score (MOS) is shown with an opinion score of 1.0. The opinion score of 1.0 indicates that there may be a lot of perceptible artifacts that are annoying in the opinion of the subjects. A heat map 604 may list region scores for respective regions and also be coded with different intensities of grayscale as the region score changes from 0 to 100. A higher region score is where regions were selected more times as including perceivable artifacts and a lower region score is where regions were selected less times. The regions may be identified by the Y axis identifiers from 0 to 2 and the X axis identifiers from 0 to 3. The intersection of identifiers may be used to identify regions, such as a region [0,1] is a region corresponding to the region score of "0" on the X axis and "1" on the Y axis. As can be seen in all the regions of the heat map, the region scores are high. For example, some regions have the region scores of 100.0 and some regions have the region score of 92.9, such as a region of [0,0] at 606 has the region score of 100 and a region of [1,0] at 608 has a region score of 92.9. The low opinion score for the image may mean that more visible artifacts are perceived and thus correlates with higher scores for most regions of the heat map.

Figure 7:
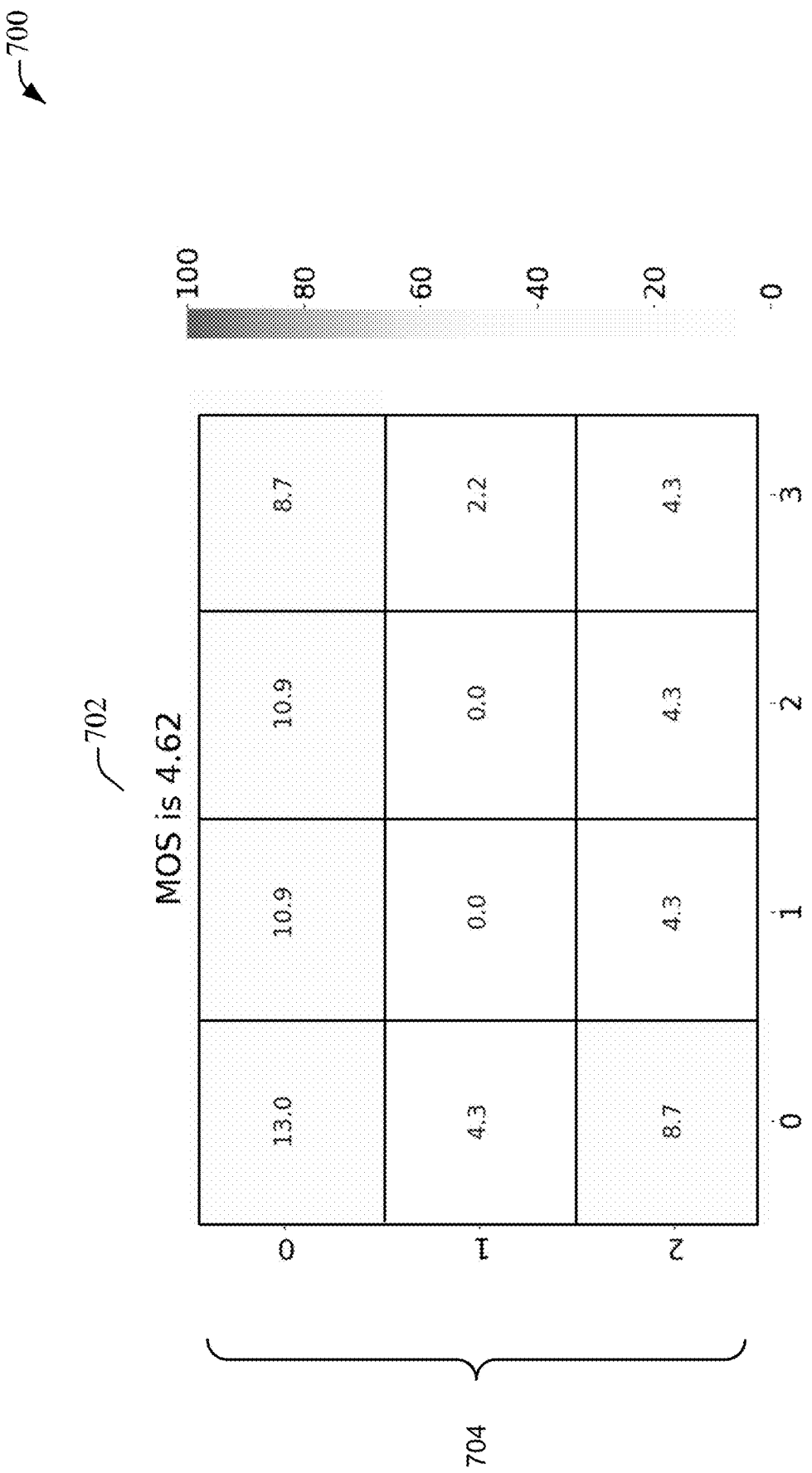
FIG. 7 depicts a second example of an opinion score and heat map according to some embodiments.

FIG. 7 depicts a second example of an opinion score and heat map according to some embodiments. At 702, the MOS score for the image is shown as 4.62. This is a high score that indicates that artifacts are perceptible, but not annoying or the artifacts may be imperceptible in the opinion of subjects. Accordingly, it may be expected that the region scores for the regions may be lower compared to the region scores in FIG. 6. In the heat map at 704, the regions include region scores that are lower than the region scores in the heat map in FIG. 6. For example, region [0,0] has a region score of 13.0, region [1,0] has a region score of 10.9, region [1,1] has a region score of 0.0 and so on. In this case, the region scores of the regions may correlate to the opinion score, where the higher opinion score may indicate that the region scores may be lower for most regions because artifacts were generally not visible.

Figure 8:
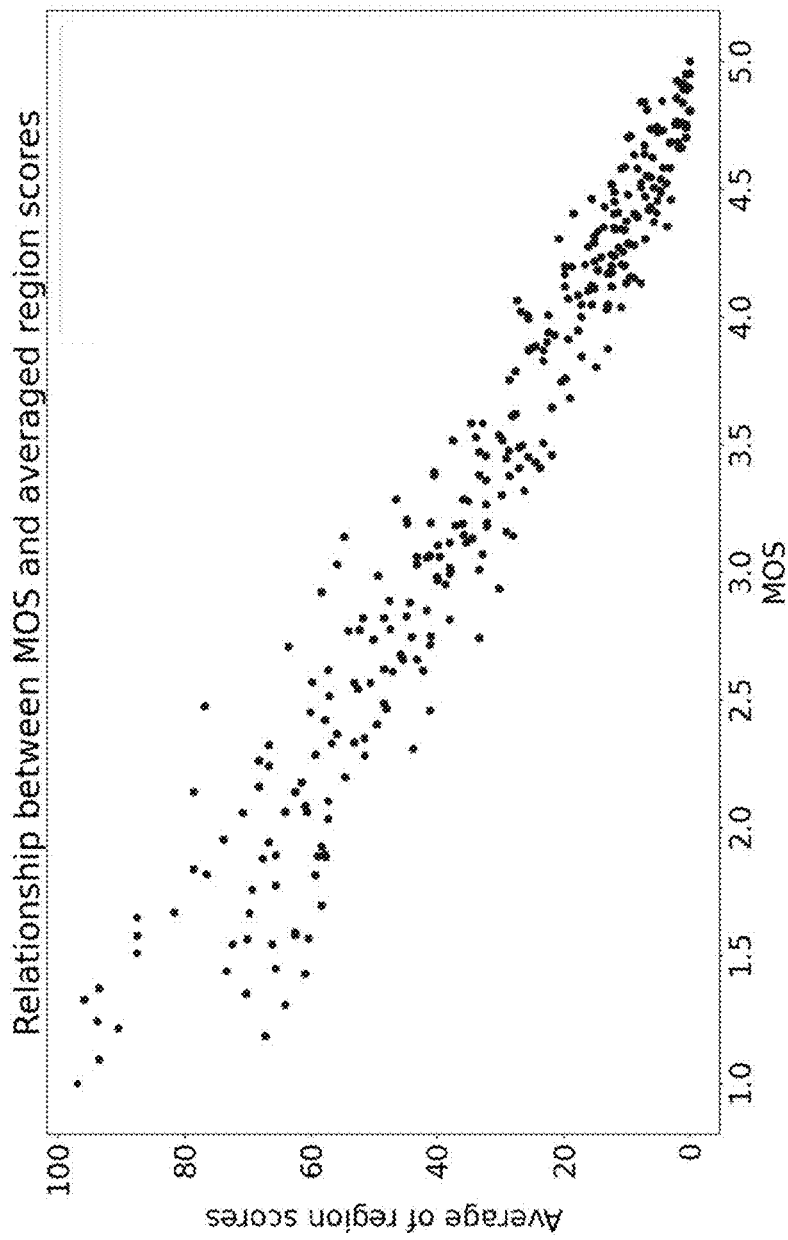
FIG. 8 depicts an example of a graph that shows the relationship between the opinion score and the region level scores according to some embodiments.

The correlation of opinion scores and region scores may be shown in a graph. FIG. 8 depicts an example of a graph 800 that shows the relationship between the opinion score and the region level scores according to some embodiments. Graph 800 includes the average of the region scores on the Y axis and the opinion score (MOS) on the X axis. When the opinion score is low, such as 1.0, the average of the region scores is higher (e.g., around 100) compared to when the opinion score is higher at 5.0, where the average of the region scores is lower (e.g., around 0). There may be linear relationship between the average region scores and the opinion score, where the average of the region scores decreases as the opinion score goes up.

Figure 9:
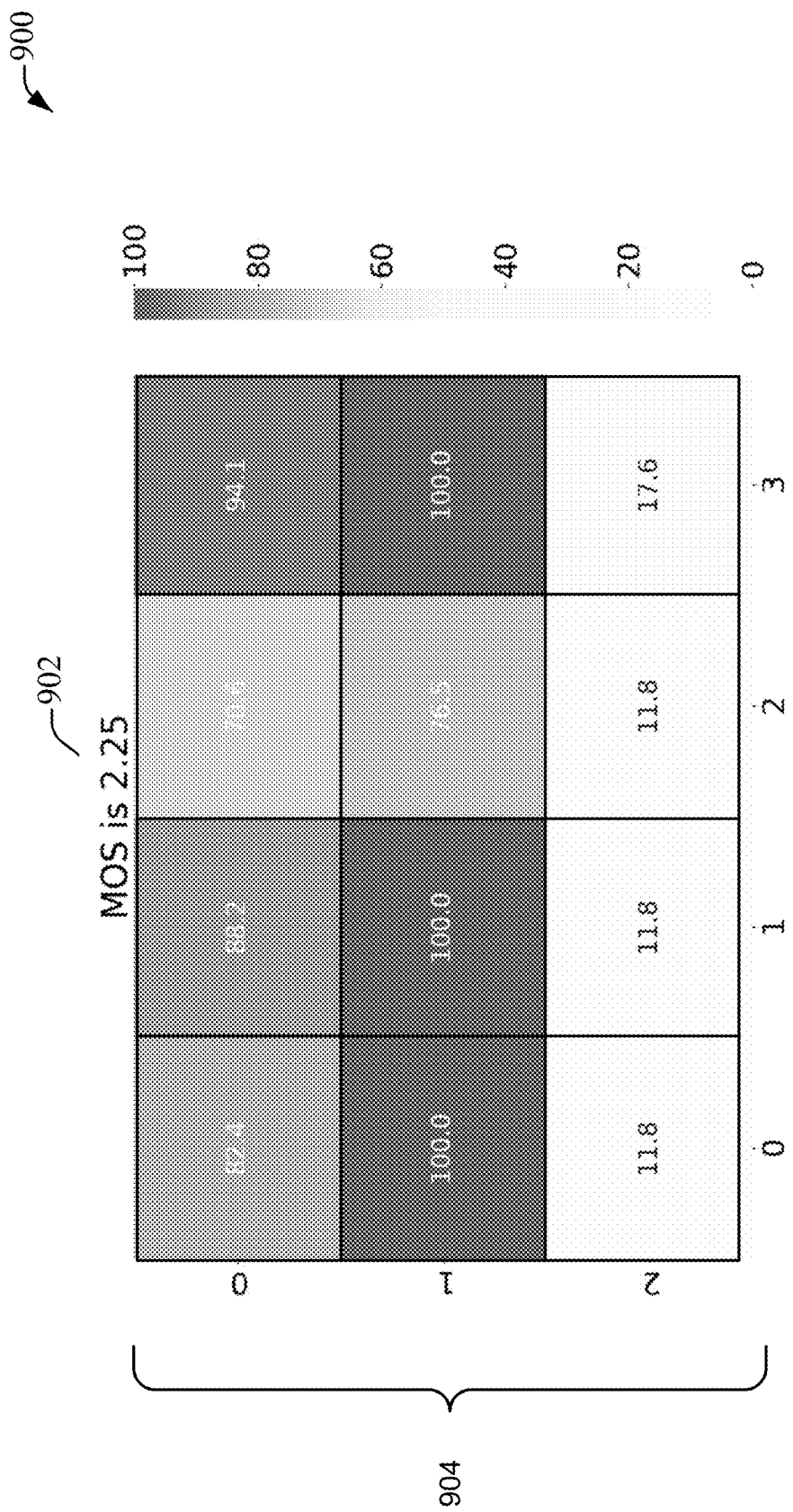
FIG. 9 depicts an example where an opinion score is in the middle of the 1-5 range according to some embodiments.

FIGS. 6 and 7 illustrated examples where the opinion score was in the low range or the high range of the 1-5 range. The region scores may be helpful to identify regions that include or do not include artifacts. In some cases, the region scores may be similar for most of the regions. However, when the opinion scores for the image are in the middle of the range the use of the region scores may be more helpful. FIG. 9 depicts an example 900 where an opinion score is in the middle of the 1-5 range according to some embodiments. At 902, the opinion score is 2.25. In this case, there may be different regions that may have different assessments of visual artifacts. For example, in the heat map at 904, the regions for row [0] include higher region scores of 82.4, 88.2, 70.6, 94.1 and regions for row [1] include higher region scores of 100.0, 100.0, 76.5, 100.0. Regions in row [2] may have lower region scores of 11.8, 11.8, 11.8, and 17.6. In general, the upper two rows of the image may have visible artifacts while the lower row may not have visible artifacts.

Figure 10:
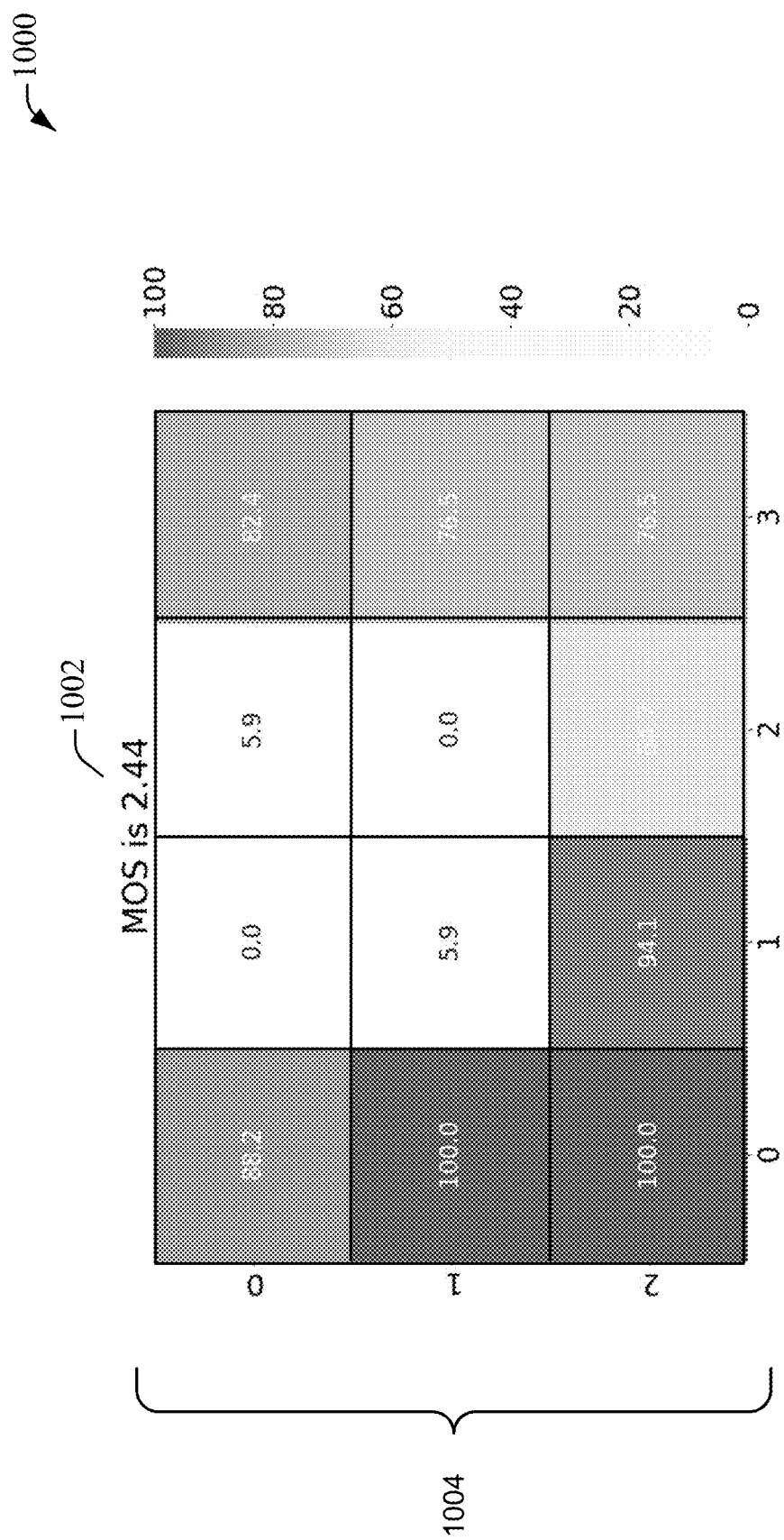
FIG. 10 shows another example of a heat map with a similar opinion score according to some embodiments.

FIG. 10 shows another example 1000 of a heat map with a similar opinion score according to some embodiments. At 1002, the opinion score is 2.44, which is similar to the score 2.25 in FIG. 9. However, the region scores for the regions in the heat map at 1004 are different compared to the heat map at 904. For example, the region scores for the regions in row [2] are much higher than corresponding region scores in FIG. 9, such as the region scores in FIG. 10 are all greater than 64.7, whereas the scores in FIG. 9 are all below 17.6 for row [2]. This may indicate the regions in row [2] of FIG. 10 may have visible artifacts, but the regions in row [2] in FIG. 9 may not have visible artifacts. Also, some region scores in regions [1,0], [2,0], [1,1], [2,1] have region scores below 5.9 in FIG. 10, whereas the corresponding regions in FIG. 9 have region scores over 70.6. This may indicate the regions [1,0], [2,0], [1,1], [2,1] in FIG. 10 may not have visible artifacts, but the regions [1,0], [2,0], [1,1], [2,1] in FIG. 9 may have visible artifacts. The heat map intensities may be used to easily determine where visible artifacts may exist. For example, in FIG. 9, visible artifacts may exist in the top 2/3 of the image, and in FIG. 10, visible artifacts may exist in the left border, bottom border, and right border. Accordingly, the use of the region scores may be helpful to determine where the visual artifacts may be located in the images.

The following will now describe the training process according to some embodiments.

Training Process

Figure 11:
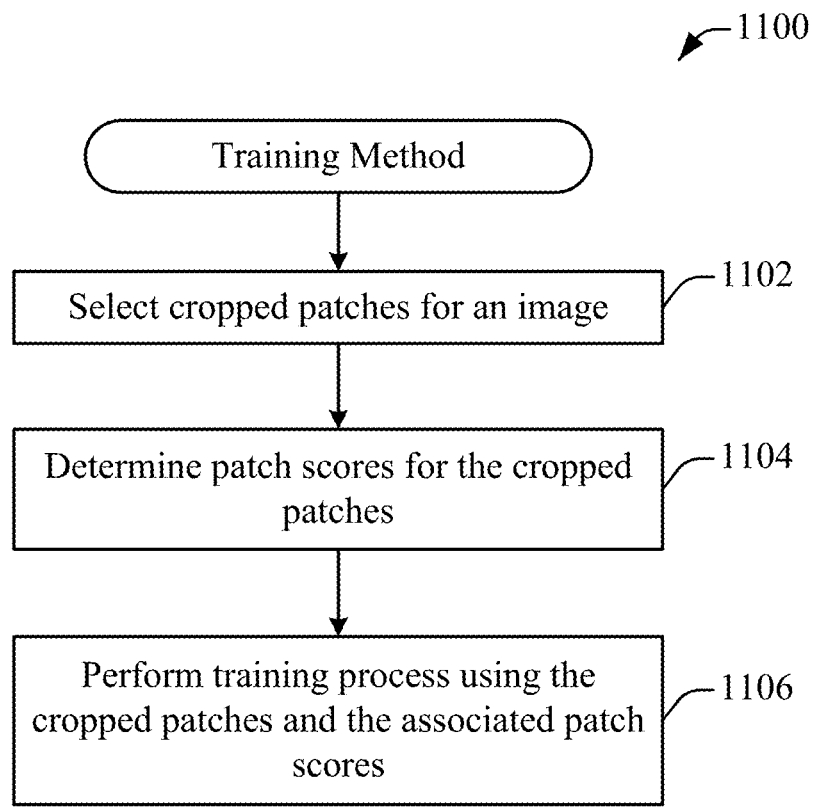
FIG. 11 depicts a simplified flowchart for performing a training process according to some embodiments.

FIG. 11 depicts a simplified flowchart 1100 for performing a training process according to some embodiments. At 1102, artifact tool system 106 selects cropped patches of an image. The cropped patches may be portions of the image. The cropped patches may be selected using different methods. For example, the cropped patches may be selected randomly, may be selected to determine a diverse number of regions in the image, may be selected based on the region scores, or using other methods.

At 1104, artifact tool system 106 determines patch scores for the cropped patches. In some embodiments, a cropped patch may be located fully within a region. In this case, the region score may be associated with the cropped patch. However, there may be cases where the cropped patch may cross multiple regions. In this case, region scores from the multiple regions may be used to determine the patch score for the cropped patch. The patch score may be determined using multiple methods, which are described in FIGS. 12, 13, 14, and 15.

After determining the patch scores for the cropped patches, at 1106, artifact tool system 106 performs a training process using the cropped patches and the associated patch scores. For example, the cropped patches may be input into a prediction network, which generates an output. One example of an output may be a measurement of visible artifacts in the cropped patch. The patch score for the cropped patch may be compared to the measurement score. Then, a difference may be used to adjust the parameters of the prediction network to generate a measurement that minimizes the difference. Other methods of training the prediction network or another process may also be used.

Figure 12:
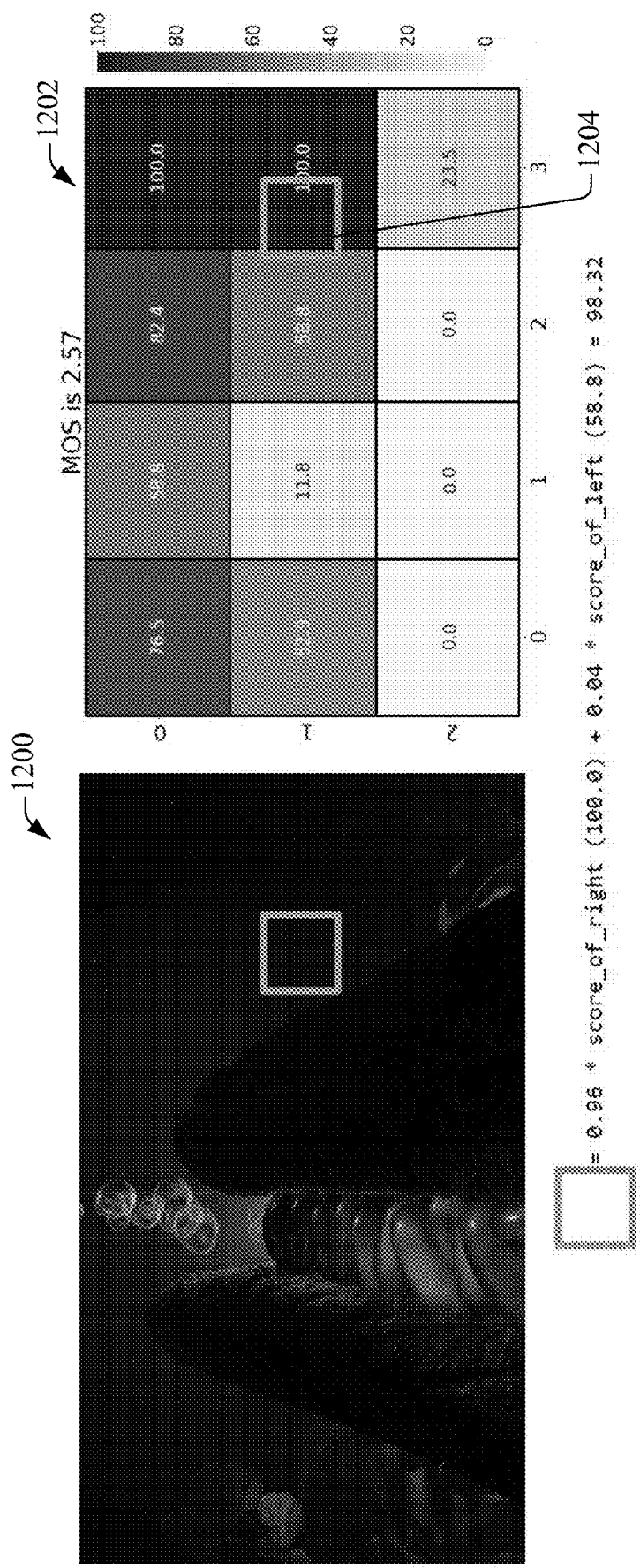
FIG. 12 depicts a first method of determining the patch scores according to some embodiments.

The following describes different examples for generating the patch scores according to some embodiments. FIG. 12 depicts a first method of determining the patch scores according to some embodiments. At 1200, an image is shown, and at 1202, a heat map and opinion score are shown. A cropped patch is shown in a green box at 1204 in the heat map and a corresponding green box of the cropped patch is shown in the image. As can be seen, the green box may overlap region [2,1] and region [3,1]. In this case, the cropped patch overlaps with two regions, but more than two regions may be overlapped.

Region [2,1] has a region score of 58.8 and region [3,1] has a region score of 100.0. A weighted average may be used for the region scores that overlap with the cropped patch. The weighted average may take the proportion of area for respective regions in the cropped patch and weight the region score based on the overlapped area. For example, 96% of the cropped patch may be located in region [3,1], and 4% of the cropped patch may be located in region [2,1]. This results in a cropped patch score of 0.96* score of region [3,1] (100.0)+0.04* score of region [2,1] (58.8)=98.32. If more than two regions are crossed, then the weighted average of the portion of area for each region may be used.

The weighted average based on the proportion of overlapping areas may mask out strong visual artifacts that are visible and thus may cause responses to be biased. Human eyes may be sensitive to artifacts, such as banding artifacts, even when they occupy a small portion of an image. Thus, when a banding region is combined with a non-banding region, the human eyes may still notice banding artifacts and select the region as including banding artifacts. The weighted average may mask out strong banding that may be visible in region [2,1] where no banding artifacts were perceived in region [3,1].

Figure 13:
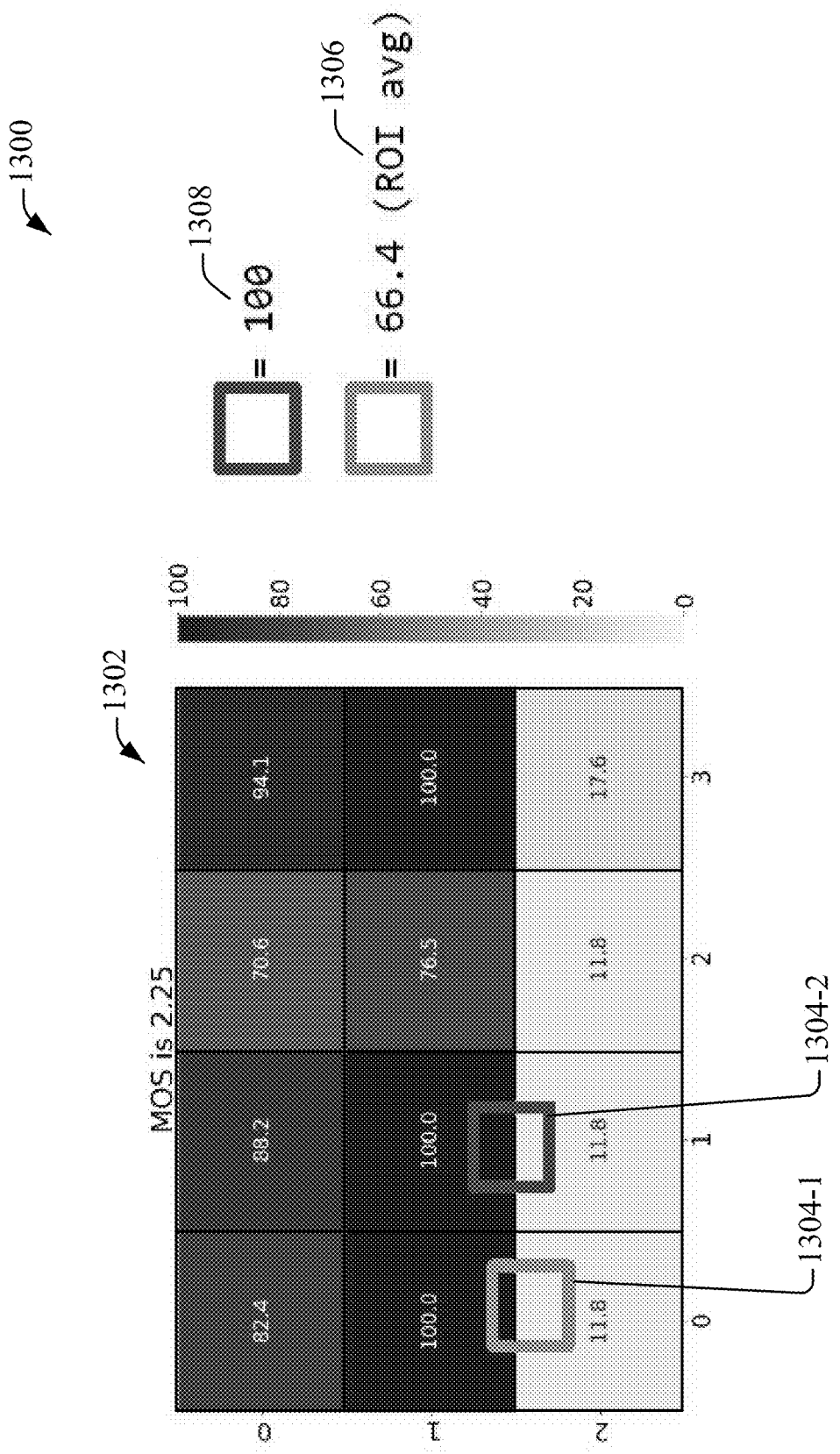
FIG. 13 depicts a second example of determining a cropped patch score according to some embodiments.

Another example of determining the patch score may use a winner takes all approach. FIG. 13 depicts a second example 1300 of determining a cropped patch score according to some embodiments. A heat map and opinion score are shown at 1302. Two cropped patches are shown at 1304-1 and 1304-2. These cropped patches may cross two regions.

In some embodiments, a higher region score may be considered a worse region score because more artifacts may be perceived. An artifact tool system 106 may determine if the proportion of the area in a region that has the higher region score (e.g., more visible artifacts may be perceived) is higher than a threshold, which may be 25% for this example. If so, the patch score is set as the higher region score, otherwise the patch score is set as the lower region score (e.g., less visible artifacts may be perceived). Also, the patch score may also be a weighted average as described in FIG. 12 instead of setting the patch score as the lower region score.

Cropped patch 1304-1 crosses region [0,1] and region [0,2]. Region [0,1] has a higher region score of 100 and region [0,2] has a lower region score of 11.8. The proportion of area that crosses into region [0,1] is more than a threshold, such as 75%, and the weighted average of 66.4 is assigned as the patch score for cropped patch 1304-1 at 1306. The region score of 100.0 of region [0,1] could also be assigned.

Cropped patch 1304-2 has around an equal overlap in region [1,1], and region [1,2]. Region [1,1] has a higher region score of 100 and region [1,2], has a lower region score of 11.8. The proportion of area that crosses into region [1,1] is more than a threshold, such as 50%, and the region score of 100.0 of region [1,1] is assigned as the patch score at 1308 for cropped patch 1304-2.

If a cropped patch crosses into four regions, artifact tool system 106 may determine the patch scores in different ways. In some embodiments, artifact tool system 106 may start a search from the region with the higher region score. If the proportion of area from the higher region score (e.g., more visible artifacts may be perceived) is greater than a threshold, the patch score is this region's score; also if the sum of the proportion of areas from the top two higher region scores is greater than a threshold, the patch score is the weighted average of these two region scores; also if the sum of the proportion of areas from the top three higher region scores is greater than a threshold, the patch score is the weighted average of these three region scores; and also if the sum of the three lowest region scores (e.g., less visible artifacts may be perceived) is lower than a threshold, the patch score is the lowest region score. Other methods may be used also to determine the patch score when four regions are crossed.

Conclusion

Accordingly, the process may determine training data 114 that may be an improvement over using only a single rating at the image level. Receiving responses for regions in the image may allow artifact tool system 106 to generate training data 114 that may be used to improve the process that is attempting to measure or mitigate the artifacts. This results in parameters that can be adjusted for the process that more accurately measure or mitigate the artifacts. Also, the training process may be performed faster using the training data 114 because the data from the regions may allow parameters to be adjusted more accurately. For example, when the image level scores with images that have regions with different region scores are used for training purposes without using the region scores, the process may have trouble differentiating between the images. However, using the region scores, the process may be able to differentiate between the images and adjust the parameters to converge faster. Also, when using cropped patches, the region scores may reflect more accurate region scores for the cropped patches. If only using an image level score, the cropped patches in a single image would have the same scores from the image level score. Using the region scores from regions that are crossed by the cropped patch to generate cropped patch scores may improve the training data and also the training process of the parameters for measuring or mitigating the artifacts.

System

Figure 14:
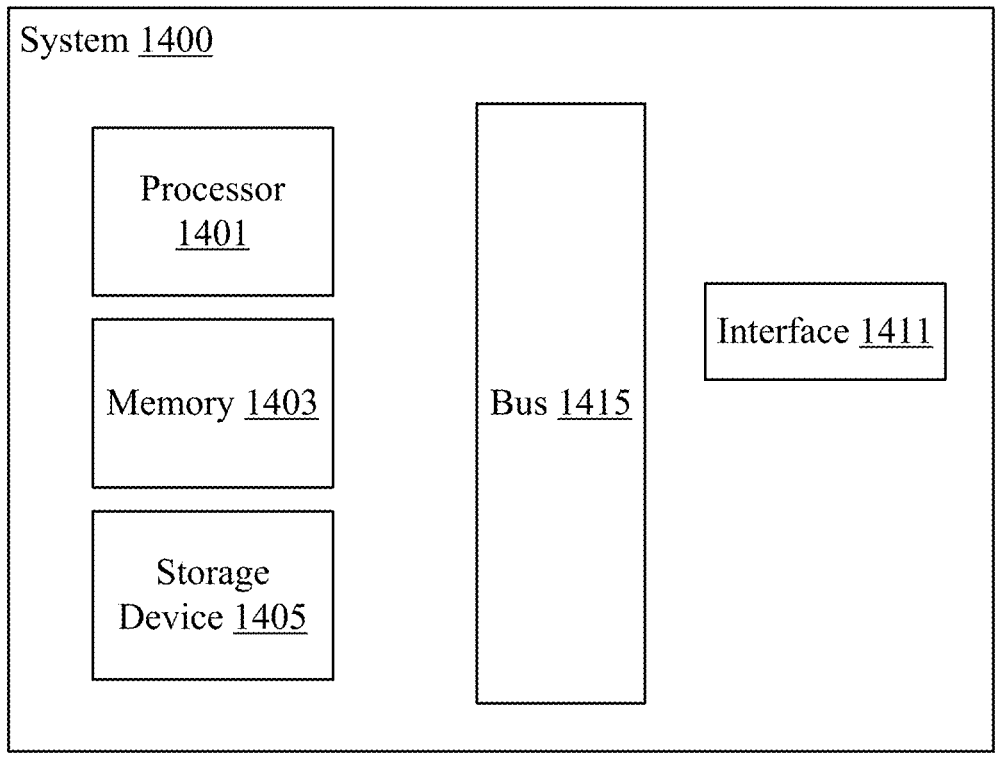
FIG. 14 illustrates one example of a computing device according to some embodiments.

FIG. 14 illustrates one example of a computing device according to some embodiments. According to various embodiments, a system 1400 suitable for implementing embodiments described herein includes a processor 1401, a memory 1403, a storage device 1405, an interface 1411, and a bus 1415 (e.g., a PCI bus or other interconnection fabric.) System 1400 may operate as a variety of devices such as server system 102 or client device 104, or any other device or service described herein. Although a particular configuration is described, a variety of alternative configurations are possible. The processor 1401 may perform operations such as those described herein. Instructions for performing such operations may be embodied in the memory 1403, on one or more non-transitory computer readable media, or on some other storage device. Various specially configured devices can also be used in place of or in addition to the processor 1401. Memory 1403 may be random access memory (RAM) or other dynamic storage devices. Storage device 1405 may include a non-transitory computer-readable storage medium holding information, instructions, or some combination thereof, for example instructions that when executed by the processor 1401, cause processor 1401 to be configured or operable to perform one or more operations of a method as described herein. Bus 1415 or other communication components may support communication of information within system 1400. The interface 1411 may be connected to bus 1415 and be configured to send and receive data packets over a network. Examples of supported interfaces include, but are not limited to: Ethernet, fast Ethernet, Gigabit Ethernet, frame relay, cable, digital subscriber line (DSL), token ring, Asynchronous Transfer Mode (ATM), High-Speed Serial Interface (HSSI), and Fiber Distributed Data Interface (FDDI). These interfaces may include ports appropriate for communication with the appropriate media. They may also include an independent processor and/or volatile RAM. A computer system or computing device may include or communicate with a monitor, printer, or other suitable display for providing any of the results mentioned herein to a user.

Any of the disclosed implementations may be embodied in various types of hardware, software, firmware, computer readable media, and combinations thereof. For example, some techniques disclosed herein may be implemented, at least in part, by non-transitory computer-readable media that include program instructions, state information, etc., for configuring a computing system to perform various services and operations described herein. Examples of program instructions include both machine code, such as produced by a compiler, and higher-level code that may be executed via an interpreter. Instructions may be embodied in any suitable language such as, for example, Java, Python, C++, C, HTML, any other markup language, JavaScript, ActiveX, VBScript, or Perl. Examples of non-transitory computer-readable media include, but are not limited to: magnetic media such as hard disks and magnetic tape; optical media such as flash memory, compact disk (CD) or digital versatile disk (DVD); magneto-optical media; and other hardware devices such as read-only memory ("ROM") devices and random-access memory ("RAM") devices. A non-transitory computer-readable medium may be any combination of such storage devices.

In the foregoing specification, various techniques and mechanisms may have been described in singular form for clarity. However, it should be noted that some embodiments include multiple iterations of a technique or multiple instantiations of a mechanism unless otherwise noted. For example, a system uses a processor in a variety of contexts but can use multiple processors while remaining within the scope of the present disclosure unless otherwise noted. Similarly, various techniques and mechanisms may have been described as including a connection between two entities. However, a connection does not necessarily mean a direct, unimpeded connection, as a variety of other entities (e.g., bridges, controllers, gateways, etc.) may reside between the two entities.

Some embodiments may be implemented in a non-transitory computer-readable storage medium for use by or in connection with the instruction execution system, apparatus, system, or machine. The computer-readable storage medium contains instructions for controlling a computer system to perform a method described by some embodiments. The computer system may include one or more computing devices. The instructions, when executed by one or more computer processors, may be configured or operable to perform that which is described in some embodiments.

As used in the description herein and throughout the claims that follow, "a", "an", and "the" include plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of some embodiments may be implemented. The above examples and embodiments should not be deemed to be the only embodiments and are presented to illustrate the flexibility and advantages of some embodiments as defined by the following claims. Based on the above disclosure and the following claims, other arrangements, embodiments, implementations, and equivalents may be employed without departing from the scope hereof as defined by the claims.

What is claimed is:

1. A method comprising:
    sending information for a sample of content, a first question, and a second question for output on an interface, wherein the first question is configured to receive, from a subject, a first response for a sample level rating for an artifact that is perceived to be visible in the sample of content and the second question is configured to receive, from the subject, a second response for one or more regions in a plurality of regions in the sample of content that are perceived to contain the artifact;

receiving the first response for the sample level rating and the second response for one or more regions that are perceived to contain the artifact;

combining first responses for the first question from multiple subjects to generate an opinion score for the sample of content and combining second responses for the second question from the multiple subjects to generate region scores for regions in the plurality of regions; and generating training data from the opinion score and the region scores to train a process to perform an action based on the artifacts in one or more regions in the sample of content, wherein generating training data comprises:

determining a cropped patch of a portion of the sample of content;

determining regions that are included in the cropped patch; and determining a patch score based on region scores for the regions that are included in the cropped patch.

2. The method of claim 1, further comprising:
determining a dataset for a subjective assessment to be performed by the subject; and
retrieving the sample of content from the dataset.

3. The method of claim 2, further comprising:
sending multiple samples of content from the dataset for output on the interface;
receiving first responses and second responses for respective samples of content in the multiple samples of content; and
generating training data for the samples of content using the respective first responses and second responses.

4. The method of claim 1, wherein:
the first response comprises a value from a range for the sample level rating, and
the second response comprises identifiers for the one or more regions that are selected.

5. The method of claim 1, wherein combining the first responses from multiple subjects comprises:
generating a mean of the sample level ratings from the first responses.

6. The method of claim 1, wherein combining the second responses from multiple subjects comprises:
generating a value based on a number of subjects that select respective regions.

7. The method of claim 6, wherein the value is a percentage of subjects that selected respective regions.

8. The method of claim 1, wherein the region scores are represented in a heat map that displays the respective region scores in association with the regions.

9. The method of claim 1, wherein generating training data comprises:
associating the region scores for regions in the sample of content with the opinion score.

10. The method of claim 1, further comprising:
using the patch score to train the process.

11. The method of claim 1, wherein determining the patch score comprises:
using a weighted average of the region scores for the regions that are included in the cropped patch based on a proportion of area associated with each of the regions in the cropped patch.

12. The method of claim 1, wherein determining the patch score comprises:
selecting one of the region scores to be the patch score.

13. The method of claim 1, wherein determining the patch score comprises:
determining a proportion of area for a region that has a higher region score, wherein the higher region score indicates more artifacts were perceived to be visible;
when the proportion of area meets a threshold, selecting the patch score based a region score for the region that has the higher region score, and
when the proportion of area does not meet the threshold, selecting the patch score based on a region score for a region with a lower region score.

14. The method of claim 1, wherein determining the patch score comprises:
determining a proportion of area for a plurality of regions;
when a proportion of area for a first region that has a highest region score meets a threshold, selecting the patch score based the region score for the region that has the highest region score, wherein the higher region score indicates more artifacts were perceived to be visible,
when the proportion of area for two regions that have a highest region score meets the threshold, selecting the patch score based on region scores for two regions,
when the proportion of area for three regions that have a highest region score meets the threshold, selecting the patch score based on region scores for three regions, and
when the proportion of area for three regions that have the highest region score does not meet the threshold, selecting the patch score based on a region score for a region with a lowest region score, wherein the lowest region score indicates less artifacts were perceived to be visible.

15. A non-transitory computer-readable storage medium having stored thereon computer executable instructions, which when executed by a computing device, cause the computing device to be operable for:
sending information for a sample of content, a first question, and a second question for output on an interface, wherein the first question is configured to receive, from a subject, a first response for a sample level rating for an artifact that is perceived to be visible in the sample of content and the second question is configured to receive, from the subject, a second response for one or more regions in a plurality of regions in the sample of content that are perceived to contain the artifact;
receiving the first response for the sample level rating and the second response for one or more regions that are perceived to contain the artifact;
combining first responses for the first question from multiple subjects to generate an opinion score for the sample of content and combining second responses for the second question from the multiple subjects to generate region scores for regions in the plurality of regions; and
generating training data from the opinion score and the region scores to train a process to perform an action based on the artifacts in one or more regions in the sample of content, wherein generating training data comprises:
determining a cropped patch of a portion of the sample of content;

determining regions that are included in the cropped patch, and determining a patch score based on region scores for the regions that are included in the cropped patch.

16. A method comprising:

outputting a sample of content, a first question, and a second question on an interface;

receiving, from a subject, a first response to the first question for a sample level rating for an artifact that is perceived to be visible in the sample of content that is output on the interface;

receiving, from the subject, a second response to the second question for one or more regions in a plurality of regions in the sample of content that are perceived to contain the artifact; and sending the first response and the second response to a server system, wherein first responses from multiple subjects are combined to generate an opinion score for the sample of content from the first responses and second responses from the multiple subjects are combined to generate region scores for regions in the plurality of regions, and training data is generated from the opinion score and the region scores to train a process to perform an action based on the artifacts in one or more regions in the sample of content, wherein generating training data comprises:

determining a cropped patch of a portion of the sample of content;

determining regions that are included in the cropped patch; and determining a patch score based on region scores for the regions that are included in the cropped patch.

17. The method of claim 16, wherein:

the interface displays the sample and a window that lists information for the first question and the second question, the first question lists a range of values for the sample level rating, and the second question displays the plurality regions associated with the sample that can be selected as including artifacts.

18. The method of claim 17, wherein receiving the second response comprises:

receiving a value from the range of values; and receiving selections of one or more regions in the plurality of regions.

19. The method of claim 16, wherein:

the interface highlights regions in the sample that are selected for the second question to allow the subject to view the artifacts in the region on the sample.

20. The method of claim 16, wherein the region scores are represented in a heat map that displays the respective region scores in association with the regions.

* * * * *